United States Patent
Reimer

(10) Patent No.: US 6,653,553 B2
(45) Date of Patent: Nov. 25, 2003

(54) COVER, CONSTRUCTED AS A SOLAR GENERATOR, FOR CLOSING AN OPENING IN THE BODYWORK OF A VEHICLE

(75) Inventor: Klaus Reimer, Wesendorf (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/107,895

(22) Filed: Mar. 27, 2002

(65) Prior Publication Data

US 2002/0139412 A1 Oct. 3, 2002

(30) Foreign Application Priority Data

Mar. 28, 2001 (DE) .......................... 101 15 372

(51) Int. Cl.$^7$ .................. H01L 31/048; B60J 7/00
(52) U.S. Cl. .................... 136/251; 136/244; 136/291; 296/211; 296/216.09; 296/214
(58) Field of Search ................. 136/251, 244, 136/291; 276/211, 216.09, 214

(56) References Cited

U.S. PATENT DOCUMENTS

| | | | |
|---|---|---|---|
| 6,034,320 A | * 3/2000 | Malcherczyk et al. | 136/251 |
| 6,155,635 A | * 12/2000 | Wecker | 296/211 |
| 6,283,542 B1 | * 9/2001 | Patz | 296/211 |
| 6,318,798 B1 | * 11/2001 | Bergmiller | 296/211 |
| 6,331,031 B1 | * 12/2001 | Patz et al. | 296/211 |
| 6,375,254 B1 | * 4/2002 | Patz | 296/216.09 |
| 6,491,341 B2 | * 12/2002 | Grimm et al. | 296/216.09 |
| 6,517,148 B1 | * 2/2003 | Teschner et al. | 296/211 |
| 6,550,852 B2 | * 4/2003 | Pätz et al. | 296/211 |
| 2002/0008411 A1 | 1/2002 | Patz et al. | |
| 2002/0021029 A1 | * 2/2002 | Bohm et al. | 296/211 |
| 2002/0105210 A1 | * 8/2002 | Grimm et al. | 296/216.09 |

FOREIGN PATENT DOCUMENTS

DE      197 16 389 C1      9/1998

OTHER PUBLICATIONS

European Search Report dated Feb. 17, 2003.

* cited by examiner

Primary Examiner—Alan Diamond
(74) Attorney, Agent, or Firm—Carlson, Gaskey & Olds

(57) ABSTRACT

A cover, constructed as a solar generator, for closing an opening in the bodywork of a vehicle which consists of a transparent panel, an assembly attached to the underside of the panel, which assembly consists of a solar cell field and a plastics material in which the latter is embedded, a frame foamed onto the peripheral edge area of the panel, optionally reinforced by embedded profiled bars, and a foam-molded backing layer connected in one piece with the frame. The simply constructed solar cover producible in this way without seal and foam-restricting arrangements exerting contact pressure forces on the assembly allows the application of elevated foaming pressures without the risk of damage to the sensitive solar cells. The backing layer protects the assembly from below and allows the foaming on of projections, ribs and the like. A preferred method of producing the solar cover is also proposed, in which the foaming pressure is >1 bar.

18 Claims, 4 Drawing Sheets

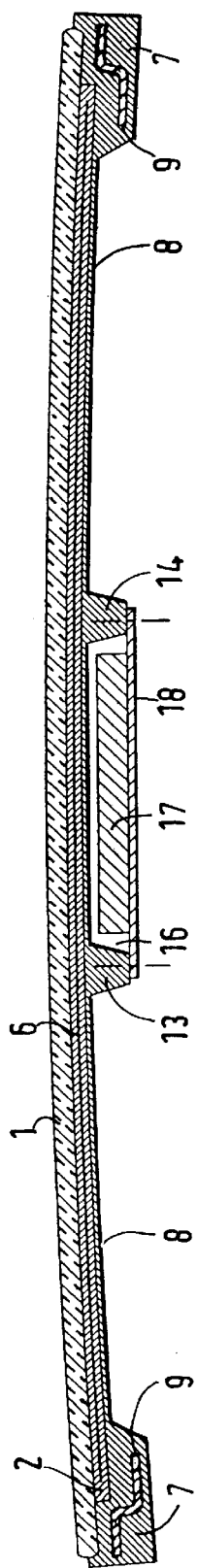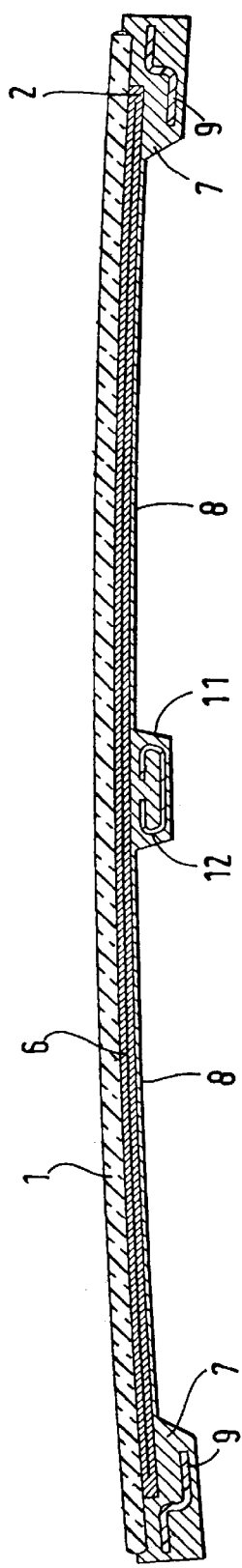

COVER, CONSTRUCTED AS A SOLAR GENERATOR, FOR CLOSING AN OPENING IN THE BODYWORK OF A VEHICLE

BACKGROUND OF THE INVENTION

The invention relates to a cover, constructed as a solar generator, for closing an opening in the bodywork of a vehicle, in particular for motor vehicle sunroofs. The invention additionally relates to a method of producing such a cover.

The term "sunroof", used here alone or in phrases, is intended, for the purposes of the present invention, to cover not only designs in which the cover may be slid under the fixed rear roof surface to uncover the roof opening after lowering of its rear edge but also slide and lift sunroofs, in which the cover may additionally be tilted from its closed position about a tilt axis provided in the vicinity of its front edge so as to project above the fixed roof surface. Front-hinged covers which open out in the manner of ventilation shutters and sliding sunroofs in which the cover may be slid partially over the rear fixed roof surface to uncover the roof opening after lifting of its rear edge and, in some designs, also tilted ("spoiler roof") are also included. Finally, the term "sunroof" also covers multi-cover roofs, in which at least one cover may be opened out, and also roofs with removable covers or cover parts.

BRIEF DESCRIPTION OF THE PRIOR ART

A cover constructed as a solar generator, hereinafter known as a solar cover, for motor vehicle sunroofs is known from DE 197 39 615 C1 belonging to the applicant. It comprises a glass panel and a solar cell field which consists of a plurality of crystalline solar cells connected together electrically and is arranged beneath the glass panel. The solar cell field is only slightly smaller in its external dimensions than the free outer surface of the glass panel, wherein a frame of a polyurethane-based plastics, which covers the external edge areas of the solar cell field from beneath, is foamed onto the solar cover with low foaming pressure. This ensures on the one hand that a solar cell field of maximum external dimensions, predetermined by the cover size, may be accommodated and on the other hand that, due to the low foaming pressure and the low temperature accompanying this pressure, the risk of breakage of and damage to the sensitive crystalline solar cells is eliminated to a considerable extent. However, the reaction rate is lower than in the case of conventional RIM (reaction injection molding) foaming processes, at which higher pressures occur. Because of the longer reaction times accompanying the low pressures, the mold closing times for the foaming molds used are longer.

In addition, to avoid damage to the solar cell assembly during production of a solar cover, it was proposed (DE 198 19 680 C1) to effect production in such a way that, first of all, a plastics frame of polyurethane is foamed onto the edge of a cover plate and then the solar cell assembly is laminated onto the inside of the cover plate. Only once this assembly of cover plate and plastics frame has been produced is a cover insert for reinforcing the solar cover adhered to said assembly at a distance from the solar cell assembly. This known method is complicated and time-consuming owing to the large number of steps to be performed in succession.

In the case of another known solar cover (DE 199 11 811 C1), the solar cells are embedded in a resilient film assembly, which extends with a marginal zone externally beyond the solar cells and is clamped sealingly between a support element and the cover panel. The clamped marginal zone serves as a seal with regard to the foamed material provided around the outer edge of the cover panel.

In the production of the known solar covers, in which a plastics frame is foamed onto the transparent panel once a solar cell field has been applied to the panel (DE 197 39 615 C1, DE 199 11 811 C1), special measures have in each case to be taken to achieve a seal, i.e. delimitation of the foaming zone with regard to the solar cell field, without at the same time damaging the solar cells.

SUMMARY OF THE INVENTION

The object of the invention is to simplify manufacture of the solar cover described above. The object also includes the provision of a method of producing said solar cover.

According to one aspect of the present invention, there is provided a cover constructed as a solar generator for closing an opening in the bodywork of a vehicle, the cover having a transparent panel with an underside on which is arranged a solar cell field, the solar cell field having outer edge areas, and the cover having a frame of plastics, which is foamed onto a peripheral edge area of the transparent panel and covers the outer edge areas of the solar cell field from below; wherein a plastics backing layer adjoining the solar cell field is foamed onto the cover over the entire surface, said backing layer covering the solar cell field completely from below and being formed in one piece with the plastics frame.

In the present construction of the solar cover, the solar cover is foam-backed over its entire underside, such that the solar cell field is arranged without mutual vertical spacing between the transparent panel and the foamed backing layer. Since the frame is formed in one piece with the backing layer, no seals have to be provided between the frame and the solar cell field, because the frame and the backing layer adjoining the solar cell field form a unified foaming zone. Because in particular of the lack of seal contact pressure against the solar cell field, damage to the crystalline solar cells is ruled out. The foaming process may be performed at comparatively elevated foaming pressures of >1 bar, whereby the reaction rate increases and the mold closing time is reduced. The backing layer may be foamed directly onto the solar cell field, i.e. the crystalline solar cells embedded in resilient plastics material, without the interposition of an additional backing or protective film, which further simplifies production.

Due to the closed, foamed-on backing layer on the underside of the cover, there is an advantageous freedom of design with regard to the cover underside. For instance, it is not only possible to foam rigid profiled bars into the frame at a distance from the solar cell field to reinforce the frame. It is also possible to provide ribbing or other shaping, for example in the form of a transverse rib extending through from one frame side to the other, into which a reinforcing profile may be foamed. It is also possible to form receiving spaces for electrical/electronic components on the backing layer.

To accommodate a direct current converter and for direct contacting thereof with the power line of the solar generator, a receiving space may be formed laterally on the frame, such that very short connecting lines are possible, whereby low line resistances and high efficiency are achieved.

According to another aspect of the present invention, there is provided a method of producing a cover constructed as a solar generator for closing an opening in the bodywork of a vehicle, the cover having a transparent panel with an underside on which is arranged a solar cell field, the solar cell field having outer edge areas, and the cover having a frame of plastics, which is foamed onto a peripheral edge area of the transparent panel and covers the outer edge areas of the solar cell field from below; wherein a plastics backing layer adjoining the solar cell field is foamed onto the cover over the entire surface, said backing layer covering the solar cell field completely from below and being formed in one piece with the plastics frame; the method comprising the following steps:

a) a solar cell field, embedded in a resilient film assembly, is attached to the underside of the transparent panel so as to extend into the outer edge areas thereof;

b) the transparent panel with solar cell field attached thereto is inserted into a bottom part of a foaming mould in positioned manner, said bottom part comprising a peripheral depression shaped in accordance with the frame structure and a substantially shallow recess connected on all sides with the shaped depression and spaced approximately evenly from the underside of the solar cell field;

c) after closure of the foaming mould by a mould top, the shaped depression, the shallow recess and the backing layer on the backing layer are jointly back-filled with foam at a pressure of >1 bar; and d) the mould top is removed and the finished solar cover with frame and backing layer moulded in one piece thereon is removed from the mould bottom.

If strengthening or reinforcement is provided for the solar cover and/or the contacts connecting in current-conducting manner with the solar cells of the solar cell field are to have an easily couplable and uncouplable outlet in the manner of a socket/plug, rigid profiled bars and optionally reinforcing profiles and optionally plug connection elements or the like are inserted into the bottom of the mold in positioned manner prior to implementation of method step b), such that they are embedded in the foamed plastics during the foaming process without touching the solar cell field or, in the case of the plug connection elements or the like, are molded on or in indirectly or directly during the foaming process.

BRIEF DESCRIPTION OF THE DRAWINGS

For a better understanding of the invention and to show how the same may be carried into effect, reference will now be made, by way of example, to the accompanying drawings, in which:

FIG. 2 shows the section through the solar cover corresponding to section line II—II in FIG. 1, FIG. 4 shows the section through the solar cover corresponding to section line IV—IV in FIG. 3.

DESCRIPTION OF THE PREFERRED EMBODIMENT

Figure 1:
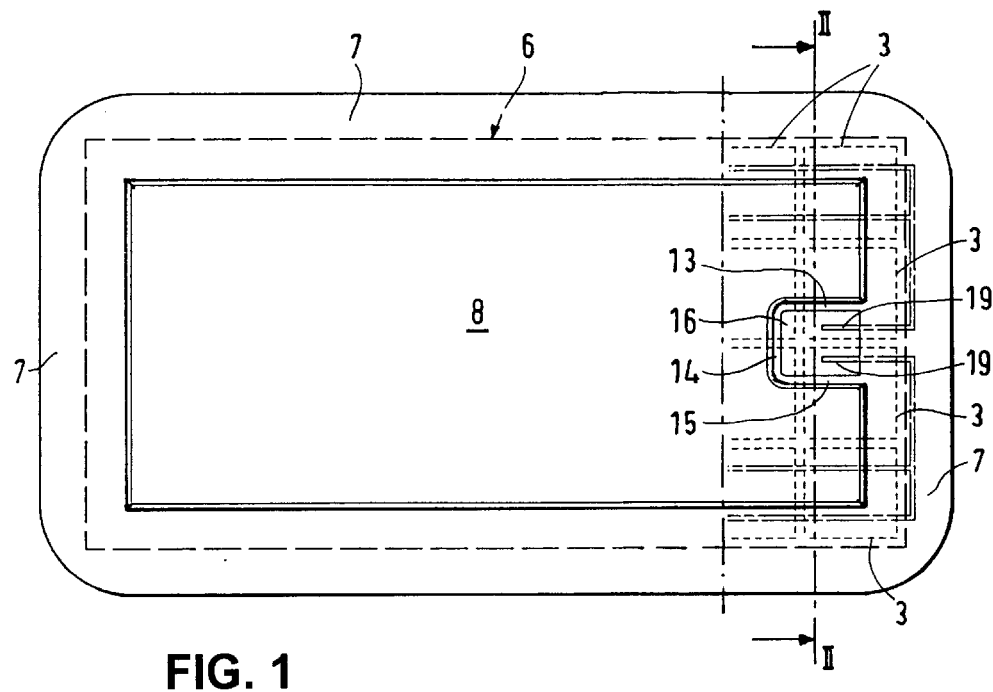
FIG. 1 is a view from below of a solar cover in a first embodiment.

The solar covers illustrated in the two embodiments differ only in relation to the arrangement of foamed-on structures, such that the cover structure will firstly be described below for both embodiments with reference to FIGS. 1 and 2.

The transparent panel 1, a glass panel in the example, which defines with its dimensions, its contour design and its curvature substantially the external shape of the solar cover, bears on its underside the crystalline solar cells 3 embedded in a resilient plastics material 2. The resilient plastics material 2 may consist originally of two separate hot-melt film adhesives of for example EVA (ethylene-vinyl-acetate copolymer), between which the solar cells 3 are inserted. During heat/vacuum treatment, the two films fuse to form an embedding layer of resilient plastics material 2, which adheres firmly to the under surface of the panel 1 and may be covered underneath with a backing film 4, as is clear from FIG. 5. Such a backing film is not absolutely essential to the present invention, for which reason it is not shown in FIGS. 2 and 4.

After assembly, the panel 1, the resilient plastics material 2 with the solar cells 3 embedded therein and optionally the backing film 4 form a one-piece assembly 5, which is stored and transported in this form and finally provided with a frame, which has yet to be described, and at the same time with a backing for the assembly 5, which has likewise yet to be described, to finish the solar cover.

Figure 3:
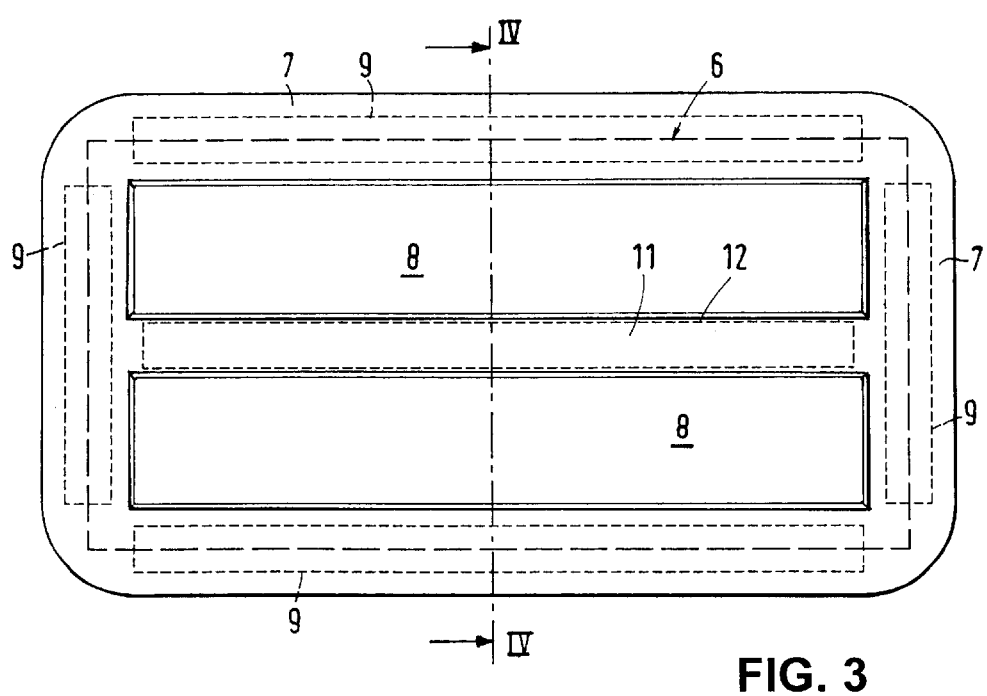
FIG. 3 is a view from below of a solar cover in a second embodiment.

The crystalline solar cells 3, which, at a thickness of only approximately 0.1 to 0.3 mm, are very fragile, may each comprise area dimensions of approximately 100×100 mm, for example. The individual cells are connected together electrically and have a common outlet, which is provided on the solar cover in a manner still to be described. The solar cells 3, spaced mutually by approximately 2 to 5 mm and arranged in regular rows, form a closed solar cell field 6, as illustrated in FIGS. 1 and 3 by a broken contour line, wherein FIG. 1 shows just some of the solar cells 3 of the solar cell field 6 to the right of a dash-dotted line. As the drawings likewise show, the solar cell field 6 is only slightly smaller in its external dimensions than the free outer surface of the panel 1, such that the outer surface of the panel 1 is very extensively covered underneath with solar cells 3, whereby high energy efficiency may be achieved.

Figure 5:
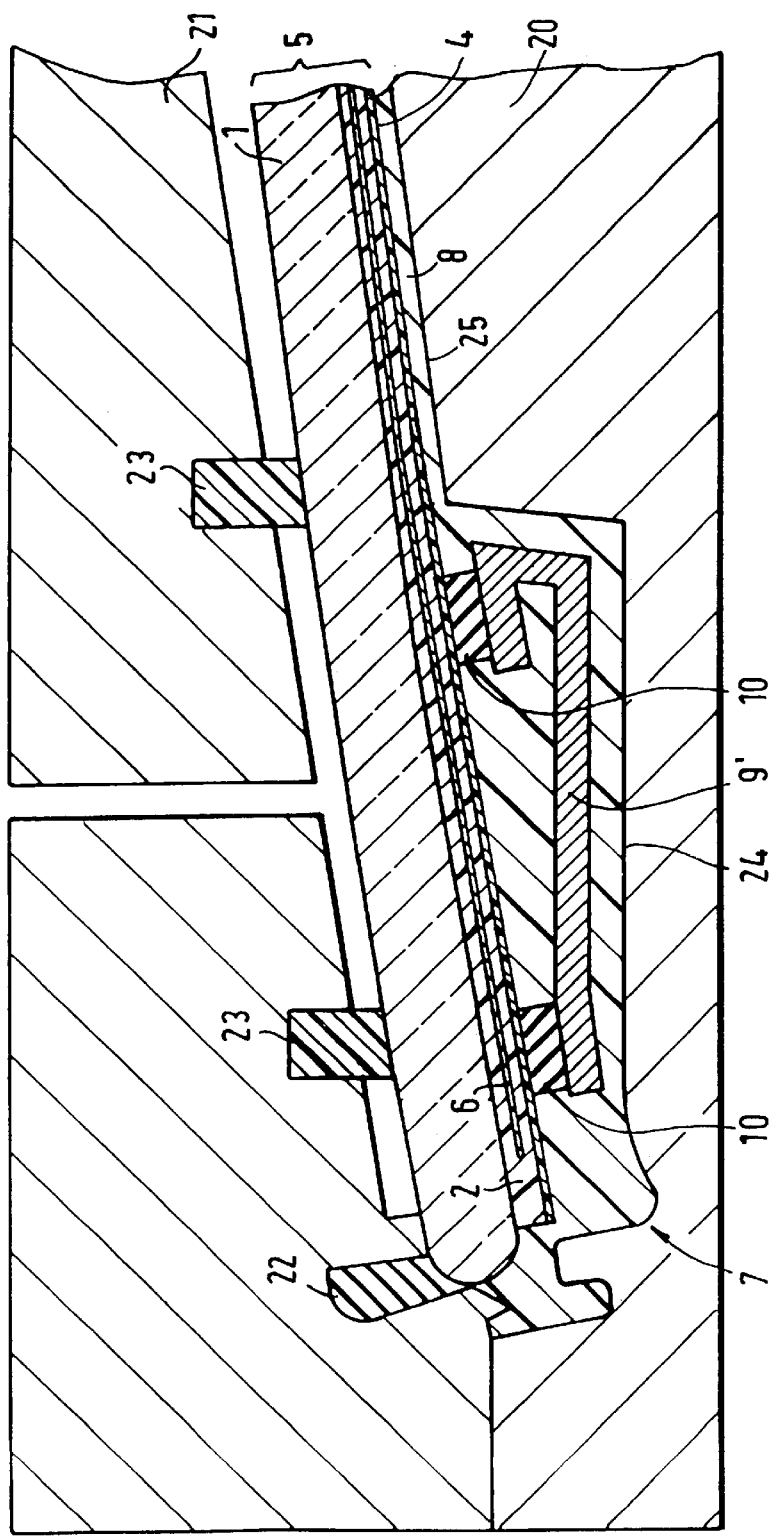
FIG. 5 is a view, after the foaming process, of a broken-away section through a side area of a closed foaming mold with the solar cover still in the mold
Figure 6:
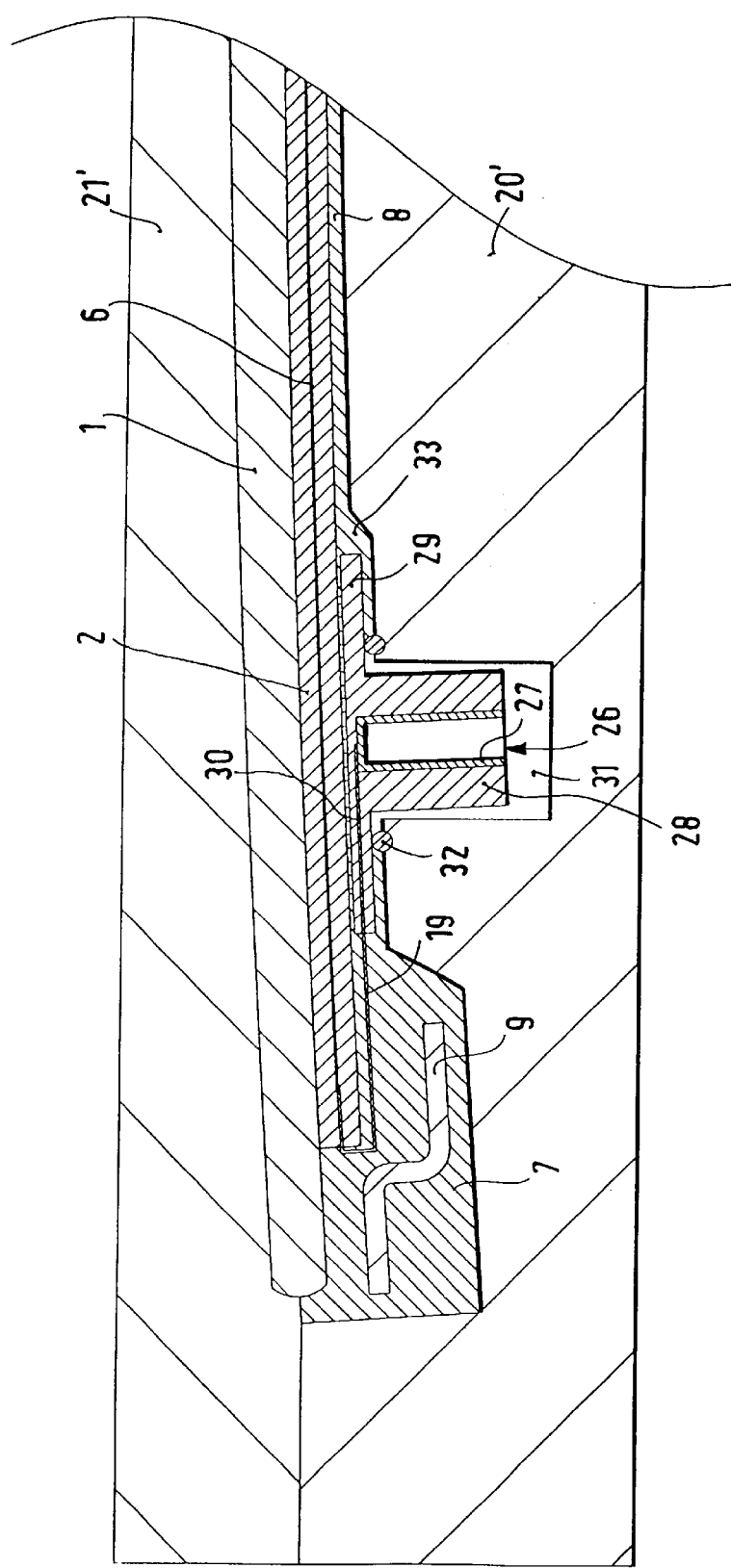
FIG. 6 is a view, after the foaming process, of a broken-away section similar to FIG. 5 through a side area of a closed foaming mold with the solar cover still in the mold and with a plug connection element in the form of a socket molded on indirectly via a socket housing.

The solar cover has a frame 7 located substantially beneath the panel 1, which frame 7 consists of a polyurethane-based plastics, which is injection-molded or foamed onto the solar cover. As is clear from the drawings, the foamed-on frame 7 covers the outer edge areas of the solar cell field from below on all sides. A plastics backing layer 8 adjoining the solar cell field 6 is foamed onto the solar cover over the entire surface, said backing layer 8 covering the solar cell field 6 completely from below and being molded in one piece with the frame 7 from the same plastics. As FIGS. 5 and 6 show in particular, the frame 7 and the backing layer 8 form a one-piece foamed item, which is connected by foaming firmly with the panel 1 and the solar cell field 6, optionally with the interposition of the backing film 4.

By foaming on the backing layer 8, not only are the solar cells 3 protected effectively against damage by mechanical loads, impacts etc., but localised exposure of the solar cells to pressure, as might be caused by seals pressing against the underside of the solar cover in the foaming mold and mold closing forces, is also prevented. With the solar cover according to the invention and the method of production thereof, such seals between frame 7 and solar cell field 6 are omitted, because no flow restrictors/seals for the polyurethane plastics are provided herein during foaming on of the frame.

As is revealed by FIGS. 2, 4, 5 and 6, the frame 7 is foamed only onto the underside of the solar cover and onto the outer edge of the panel 1, such that virtually the entire outer top surface of the panel 1 remains free. In the representation shown in FIG. 5, the frame 7 comprises profiling which differs from the embodiments according to FIGS. 2, 4 and 6. At the outer edge of the frame 7 shown in FIG. 5, there is located conventionally configured, undercut profiling designed to accommodate an edge gap seal (not shown) of the sunroof.

To reinforce the frame, rigid profiled bars 9 or 9' (FIG. 5) are foamed into the four frame parts of the frame 7, at a distance from the solar cell field 6. Due to the fragility of the solar cells 3, care must be taken to ensure that the profiled bars 9 cannot exert any destructive pressure on the assembly 5. This may be achieved by appropriate molding measures, by means of which the profiled bars are kept at a distance from the assembly 5 as early as during foaming on of the frame and naturally also in the finished solar cover. It may also be achieved by the interposition of spacers 10 of soft material, for example microcellular rubber or soft polyurethane, between the mutually facing surfaces of the assembly 5 and the profiled bars 9 or 9', as shown in FIG. 5. The spacers 10 adjoin the assembly 5 from beneath and are appropriately connected to the profiled bars 9 or 9' by adhesion.

In the embodiment shown in FIGS. 3 and 4, a continuous transverse rib 11 is foamed onto the backing layer 8 between the two lateral frame parts. This is formed in a corresponding groove in the foaming mold and in one piece with the frame 7 and the backing layer 8. A rigid reinforcing profile 12 is foamed into the transverse rib 11, which profile is kept spaced from the solar cell field 6 or the assembly 5 in the same way as has already been described with regard to the profiled bars 9, 9', such that the solar cells 3 are not exposed to any pressure from the reinforcing profile 12.

Any desired structures projecting from the backing layer may be molded onto the backing layer, corresponding indentations being provided therefor in the foaming mold. In the case of rib-shaped projections on the backing layer, these may comprise groove-shaped structures. In the case of the embodiment illustrated in FIGS. 1 and 2, ribs 13, 14 and 15 are molded onto the backing layer, by means of which ribs 13, 14, 15, together with the adjacent part of the frame 7, a receiving space 16, open at the bottom, for an electrical/electronic component 17 is formed. The receiving space 16 may be closed by a preferably removable lid 18 after mounting of the component 17 (FIG. 2). The component 17 may for example be a DC/DC converter associated with the solar cells 3, which may be connected directly to electrical contacts 19 (FIG. 1) of the solar cell field 6 guided into the receiving space 16.

FIG. 5 shows the foaming mold in the closed state and consisting of a bottom part 20 and a top part 21, for foaming on the frame 7 and the backing layer 8 as well as any ribs which may be present. A seal 22 fitted in the top part 21, which seal 22 is made of a resilient material, defines the foaming area at the front edge of the panel 1. Moreover, pressure strips 23 of resilient material are fitted on the top part, which strips 23 transmit mold closing forces to the panel 1 and fix the panel 1, together with the assembly 5 located thereon, in the mold during the foaming process.

The bottom part 20 comprises a depression 24 appropriately profiled for forming the frame 7 and a substantially shallow recess 25 connected therewith without sealing, in which recess 25 the backing layer 8 is formed during the foaming process. The base of this recess 25 is spaced approximately uniformly from the underside of the assembly 5, such that a backing layer is formed which is approximately equal in thickness at all points. Grooves and other molding depressions may be provided in the base of the recess 25.

FIG. 6 shows that a plug connection element 26, in the example shown a socket 27 of an electrically conductive material, for example brass, is connected to each of the contacts forming the electrical outlet of the solar cell field 6. The socket 27 is located in a socket housing 28, which encloses the socket 27 and the end area of the contact 19 and to this end is injection- or foam-molded from a suitable plastics, for example a PU-based plastics. It goes without saying that the socket housing 28 may enclose a plurality of sockets 27, for example two, and a corresponding number of contacts 19.

The socket housing 28 has a flange-like sole plate 29, which is connected to the underside of the plastics material 2 embedding the solar cell field 6 or optionally of the backing film 4 by means of a double-sided adhesive tape 30 or the like. The adhesive tape 30 serves to prefix the socket housing 28 in a predetermined position, which matches a recess 31 formed in the bottom part 20' of the foaming mold and accommodating the socket housing 28 during foam molding. An annular seal 32 seals the underside of the sole plate 29 with regard to the recess 31, such that, during the foaming process, no plastics is able to penetrate into the recess 31.

After foaming, the sole plate 29 of the socket housing 28 is substantially molded into the foamed PU plastics, in the example shown in the vicinity of the frame 7 in a widened portion 33 of the backing layer 8. However, the plug connection elements 26 may appropriately also be mounted on the frame 7 or another point of the backing layer 8 or also inside the receiving space 16 (FIGS. 1, 2). Instead of the socket 27 mounted indirectly via the socket housing 28, the former may however also be molded directly on or in during the foaming process.

The foaming process may be performed both with a low foaming pressure of <1 bar and with a higher foaming pressure of >1 bar. Due to the elevated reaction rate, for the purposes of the present invention higher foaming pressures which may amount to up to approximately 12 bar (high pressure method) are preferred, without damage occurring to the solar cells 3.

In summary, the invention provides a solar cover which consists of a transparent panel 1, an assembly 5 attached to the underside of the panel 1, which assembly consists of a solar cell field 6 and a plastics material 2 in which the latter is embedded, a frame 7 foamed onto the peripheral edge area of the panel 1, optionally reinforced by embedded profiled bars 9, 9', and a foam-molded backing layer 8 connected in one piece with the frame 7. The simply constructed solar cover producible in this way without seal and foam-restricting arrangements exerting contact pressure forces on the assembly 5 allows the application of elevated foaming pressures without the risk of damage to the sensitive solar cells. The backing layer 8 protects the assembly 5 from below and allows the foaming on of projections, ribs and the like. A preferred method of producing the solar cover is also proposed, in which the foaming pressure is >1 bar.

I claim:

1. A cover for closing an opening in the body of a vehicle, comprising:

a transparent panel;

a solar cell assembly on one side of the panel such that at least a portion of the panel extends beyond at least two edges of the solar cell assembly; and a plastic layer that extends across the solar cell assembly and is foamed onto the extending edges of the transparent panel, the plastic layer having a solar cell assembly backing portion with a first, nominal thickness and a frame portion with a second thickness that is greater than the first thickness, the frame portion positioned at least along the extending edges of the transparent panel and at least partially covering outer edges of the solar cell assembly, including a transverse rib formed on the backing portion, the transverse rib being spaced from at least two laterally spaced sections of the frame portion.

2. The cover of claim 1, wherein the plastic layer is foamed onto the solar cell assembly and the transparent panel.

3. The cover of claim 1, wherein the plastic layer is continuous across the entire one side and is one piece.

4. The cover of claim 1, including rigid reinforcing members within the frame portion, the reinforcing members being spaced from the solar cell assembly and reinforcing the frame portion.

5. The cover of claim 1, including at least one reinforcing member within the transverse rib.

6. A cover for closing an opening in the body of a vehicle, comprising:

a transparent panel;

a solar cell assembly on one side of the panel such that at least a portion of the panel extends beyond at least two edges of the solar cell assembly; and a plastic layer that extends across the solar cell assembly and is foamed onto the extending edges of the transparent panel, the plastic layer having a solar cell assembly backing portion with a first, nominal thickness and a frame portion with a second thickness that is greater than the first thickness, the frame portion positioned at least along the extending edges of the transparent panel and at least partially covering outer edges of the solar cell assembly, including ribs formed on the backing portion with at least one receiving space being positioned between the ribs.

7. The cover of claim 6, including at least one electrical component supported within the receiving space.

8. The cover of claim 6, wherein the receiving space is formed at least partially laterally on the frame portion such that the receiving space is defined by the frame portion and the ribs.

9. A cover for closing an opening in the body of a vehicle, comprising:

a transparent panel;

a solar cell assembly on one side of the panel such that at least a portion of the panel extends beyond at least two edges of the solar cell assembly; and a plastic layer that extends across the solar cell assembly and is foamed onto the extending edges of the transparent panel, the plastic layer having a solar cell assembly backing portion with a first, nominal thickness and a frame portion with a second thickness that is greater than the first thickness, the frame portion positioned at least along the extending edges of the transparent panel and at least partially covering outer edges of the solar cell assembly, including electrically conductive contacts electrically coupled with corresponding portions of the solar cell assembly and including plug connection elements associated with the contacts and supported by the plastic layer.

10. The cover of claim 9, wherein the plug connection elements are supported on the backing portion.

11. The cover of claim 9, wherein the plug connection elements are supported on the frame portion.

12. The cover of claim 9, wherein the plug connection elements are supported on the frame and the backing portions.

13. The cover of claim 9, wherein the frame portion directly contacts the solar cell assembly.

14. A method of making a cover for closing an opening in the body of a vehicle, comprising the steps of:

attaching a solar cell assembly onto one side of a transparent panel;

placing the transparent panel and the attached solar cell assembly into a mold fixture that has a peripheral cavity with a first depth and a recess connected on all sides with the peripheral cavity, the recess having a second depth that is less than the first depth;

closing the mold fixture; and filling the cavity and recess with a foam at a pressure greater than one bar to thereby form the foam consistent with the cavity and recess in the mold fixture and to secure the foam to the transparent cover and the solar cell assembly, including supporting plug connection elements on the mold fixture in a selected position relative to corresponding portions of the cover prior to filling the cavity and recess with the foam.

15. The method of claim 14, including supporting rigid reinforcing members in the mold in a selected position relative to the transparent panel and solar cell assembly prior to filling the recess and cavity with the foam.

16. A method of making a cover for closing an opening in the body of a vehicle, comprising the steps of:

attaching a solar cell assembly onto one side of a transparent panel;

placing the transparent panel and the attached solar cell assembly into a mold fixture that has a peripheral cavity with a first depth and a recess connected on all sides with the peripheral cavity, the recess having a second depth that is less than the first depth;

closing the mold fixture; and filling the cavity and recess with a foam at a pressure greater than one bar to thereby form the foam consistent with the cavity and recess in the mold fixture and to secure the foam to the transparent cover and the solar cell assembly, wherein the mold fixture includes grooves spaced from the peripheral cavity and including forming ribs with the foam by filling the grooves with the foam at a pressure greater than one bar.

17. The method of claim 16, including positioning reinforcing members within the foam and positioning resilient spacers between the reinforcing members and the solar assembly prior to filling the cavity and recess with the foam.

18. The method of claim 16, wherein filling the cavity includes simultaneously forming a backing portion adjacent the solar assembly and a frame portion at least along edges of the transparent panel.

* * * * *